United States Patent

[11] 3,613,090

[72] Inventor Charles F. Mason
Fort Wayne, Ind.
[21] Appl. No. 846,143
[22] Filed July 30, 1969
[45] Patented Oct. 12, 1971
[73] Assignee International Telephone and Telegraph Corporation
Nutley, N.J.

[54] CURSOR CONTROL SYSTEM
29 Claims, 9 Drawing Figs.
[52] U.S. Cl. .................................................. 340/347 AD, 33/1
[51] Int. Cl. ................................................... H03k 13/02, G08c 9/08
[50] Field of Search ........................................ 340/347; 235/92 GC, 92; 33/1, 141, 141.5, 142, 1.5 A

[56] References Cited
UNITED STATES PATENTS
3,304,434  2/1967  Koster ........................ 33/141.5

Primary Examiner—Maynard R. Wilbur
Assistant Examiner—Jeremiah Glassman
Attorneys—C. Cornell Remsen, Jr., Walter J. Baum, Philip M. Bolt, Isidore Togut, Charles L. Johnson, Jr. and Hood, Gust, Irish & Lundy ABSTRACT: A position indicating control system includes a member mounted for selective movement in forward and reverse directions, an actuating element mounted thereon, and first, second and third sensing means respectively sensing passage of the actuating elements, the first sensing means being intermediate the second and third means. The sensing means are spaced so that the second means senses passage of the actuating element when the member is moved in one direction after the first means senses the passage and the third means senses passage of the actuating element when the member is moved in the other direction after the first means senses the passage. First and second bistable means respectively generate a first signal responsive to sensing passage in one direction of an actuating element by one of the second and third means and a second signal responsive to sensing passage in the other direction of an actuating element by the other of the second and third means to indicate the direction of movement of the member. Means are included for inhibiting the generation of signals by the bistable means except upon a predetermined sequence of sensing of the movement of the member in a particular direction by two of the three sensing means.

PATENTED OCT 12 1971 3,613,090

FIG_1

FIG_2

INVENTOR
CHARLES F. MASON
BY Hood, Gust, Irish & Lundy
ATTORNEYS

CURSOR CONTROL SYSTEM

BACKGROUND OF THE INVENTION

1. Field of the Invention

This invention relates generally to cursor control systems, and more particularly to a cursor control system of the roll ball type.

2. Description of the Prior Art

In certain data display systems, a cursor beam is provided which is selectively moved to a desired point upon the display in order to indicate a location at which additional data is to be displayed, or at which previously displayed data is to be updated. Various systems have been proposed for directing such a cursor beam to the desired X and Y coordinate location upon the display, some of these systems employing a manually actuated "joy stick" control and others a so called "roll ball" control. Certain of such prior systems have employed analog potentiometers directly driven by the control device in order to provide the requisite X and Y deflection voltages for the cursor beam. Other systems have employed digital encoders for this purpose. One such prior system of the roll ball type employs a ball mounted upon rollers to permit rotation of the ball in both polar and equatorial directions, i.e. about two mutually perpendicular axes. A roller of each set in engagement with the ball causes a multiple line shutter to rotate and interrupt a light beam. The output of the light beam is monitored by a photocell, the photocell output being passed through a threshold-type shaping circuit to prevent an unwanted gray-pulse region where a series of short pulses could be generated instead of a single wide pulse. In this prior system, the direction of rotation of the ball about one axis is determined by a slip clutch and lever-type shutter mechanism; such a mechanism, while suitable for certain applications, is not well suited to environments in which high acceleration and vibration are encountered, such as in airborne use.

It is therefore desirable to provide a cursor control system in which solid state logics are employed for determining the magnitude and direction of rotation of the control element. It is further desired that such a system eliminate any misfiring due to the equivalent of contact bounce and marginal operation. Further, it is desirable that the cursor beam initially be centered on the display screen, being deflected away from the centered location in either direction in the X and Y coordinates in response to cumulative movement of the control element about its two axes, and that the movement of the cursor be terminated at an edge of the screen and not suddenly returned to the center or opposite edge, the cursor, however, immediately moving away from the edge of the screen by actuation of the control element in the proper direction. Still further, it is desirable to provide for immediate return of the cursor to its centered location on the display screen without the necessity of turning the control element about one or both of its rotational axes, and it is also desirable to provide for selective coarse and fine movement of the cursor in response to movement of the control element.

SUMMARY OF THE INVENTION

In accordance with the invention, the magnitude and direction of rotation of the control element about an axis is determined by a coded digital wheel and pulses are generated by logics associated therewith only when the digital wheel has been turned through a definite and relatively large angle, the pulses being cumulatively counted in up and down fashion to provide a digital readout which is converted to an analog signal, the magnitude and sign of which is responsive to the magnitude and direction of rotation of the control element about its axis. This arrangement eliminates flopping shutters, slip clutches, shaft encoders, and/or critical gears of prior cursor control systems.

In its broader aspects, the invention provides apparatus for indicating the magnitude and direction of movement of a member including means for mounting the member for selective movement in forward and reverse directions, the member having a plurality of spaced actuating elements thereon. A control system is provided including first, second and third spaced means for respectively sensing passage of the actuating elements thereby, the first of the sensing means being intermediate the second and third sensing means. In one embodiment the sensing means have a spacing such that when the member is moved to a position with the first sensing means sensing passage of a first actuating element, the second and third sensing means are respectively disposed intermediate the first actuating element and second and third adjacent elements respectively on either side thereof, the second sensing means thus sensing passage of the second actuating element when the member is moved in one direction away from such position of the member, and the third sensing means sensing passage of the third actuating element when the member is moved in the opposite direction away from such position. First and second bistable devices are provided each having first and second means for switching the same between first and second stable states, the first sensing means being coupled to the first switching means of both of the devices for switching the same to their first stable states in response to sensing of passage of a first actuating element. The second sensing means is coupled to the second switching means of the first bistable device for switching the same to a second stable state in response to passage of the second actuating element, and the third sensing means is coupled to the second switching means of the second bistable device for switching the same to a second stable state in response to passage of the third actuating element. First means is provided responsive to switching of the first bistable device to its second stable state for inhibiting switching of the second bistable device to its second stable state, and second means is provided responsive to switching of the second bistable means to its second stable state for inhibiting switching of the first bistable means to its second stable state. First and second circuit means are provided respectively coupled to the first and second bistable devices for respectively providing first and second signals responsive to switching of the respective bistable device to its second stable state thereby respectively indicating the direction of movement of the member, and third circuit means is provided coupled to both of the bistable devices for providing an output signal responsive to switching of either of the bistable devices to its second stable state.

It is accordingly an object of the invention to provide a system for indicating the magnitude and direction of movement of a movable element.

Another object of the invention is to provide an improved cursor control system.

A further object of the invention is to provide an improved cursor control system of the roll ball type.

The above mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 8 is a schematic diagram illustrating the preferred embodiment of the invention.

DESCRIPTION OF THE PREFERRED EMBODIMENTS

Figure 1:
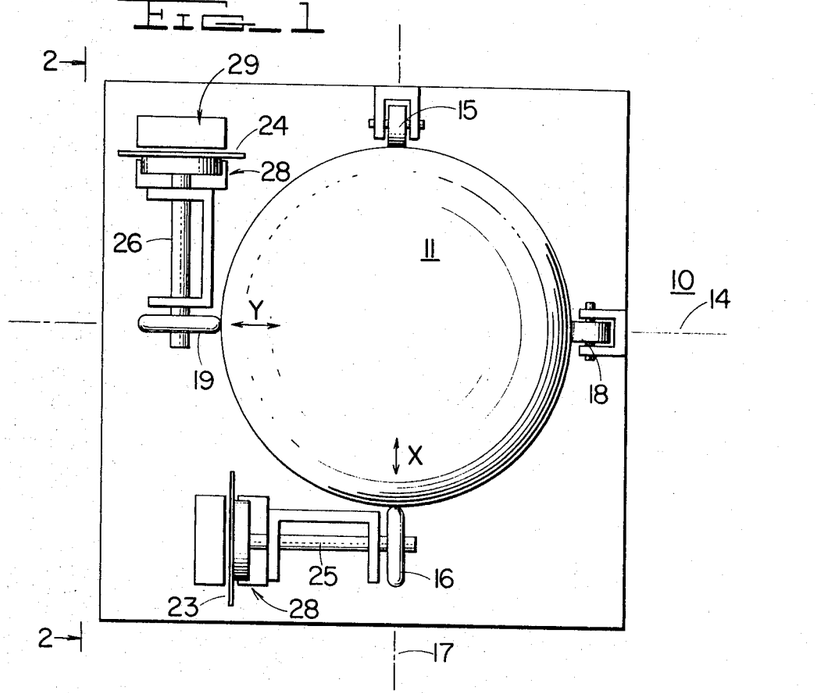
FIG. 1 is a top view of the roll ball and digital wheel assembly of the invention.
Figure 2:
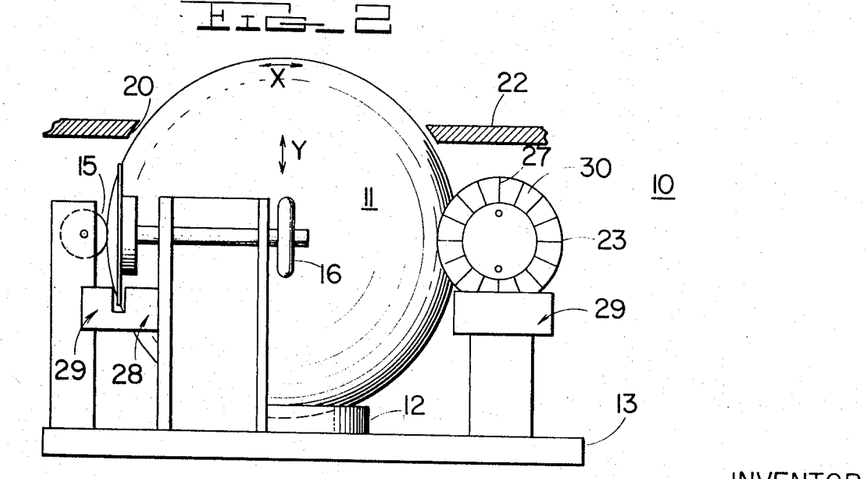
FIG. 2 is a side view, partly in cross section, viewed generally along the line 2—2 of FIG. 1.

Referring now to FIGS. 1 and 2 of the drawings, in one embodiment of the invention, a roll ball and digital wheel assembly, generally indicated at 10 is provided. Roll ball 11 is rotatably supported in socket 12 mounted on baseplate 13. Ball 11 is further supported and guided for rotational motion about a first axis, indicated by the dashed line 14, by diametrically opposite rollers 15 and 16, and for rotation about a second axis perpendicular to axis 14, indicated by the dashed line 17, by diametrically opposite rollers 18 and 19. The upper portion of ball 11 projects upwardly through opening 20 in panel 22 spaced above baseplate 13, thus permitting manual manipulation of ball 11 for rotation in forward directions about either of its axes 14 and 17, as indicated by the arrows X and Y, or simultaneously about both axes.

Rollers 16 and 19 are respectively in driven engagement with ball 11 and are rotated thereby in opposite directions in response to rotation of ball 11 about its axes 14 and 17. Transparent logic wheels 23 and 24 are provided respectively directly connected to driven rollers 16 and 19 by shafts 25 and 26, digital wheels 23 and 24 thus being rotated in opposite directions by driven rollers 16 and 19 in response to rotation of ball 11 in its X and Y directions. Digital wheels 23 and 24 respectively have radially extending, equally spaced lines 27 thereon, as best seen in FIG. 2, for a purpose shortly to be described. Each of the digital wheels 23 and 24 has a light source 28 disposed on one side thereof, and a photodiode assembly 29 disposed on the other side thereof, respectively cooperating with the lines 27 and intervening transparent portions 30 of the digital wheels 23 and 24, as will now be described.

Figure 3:
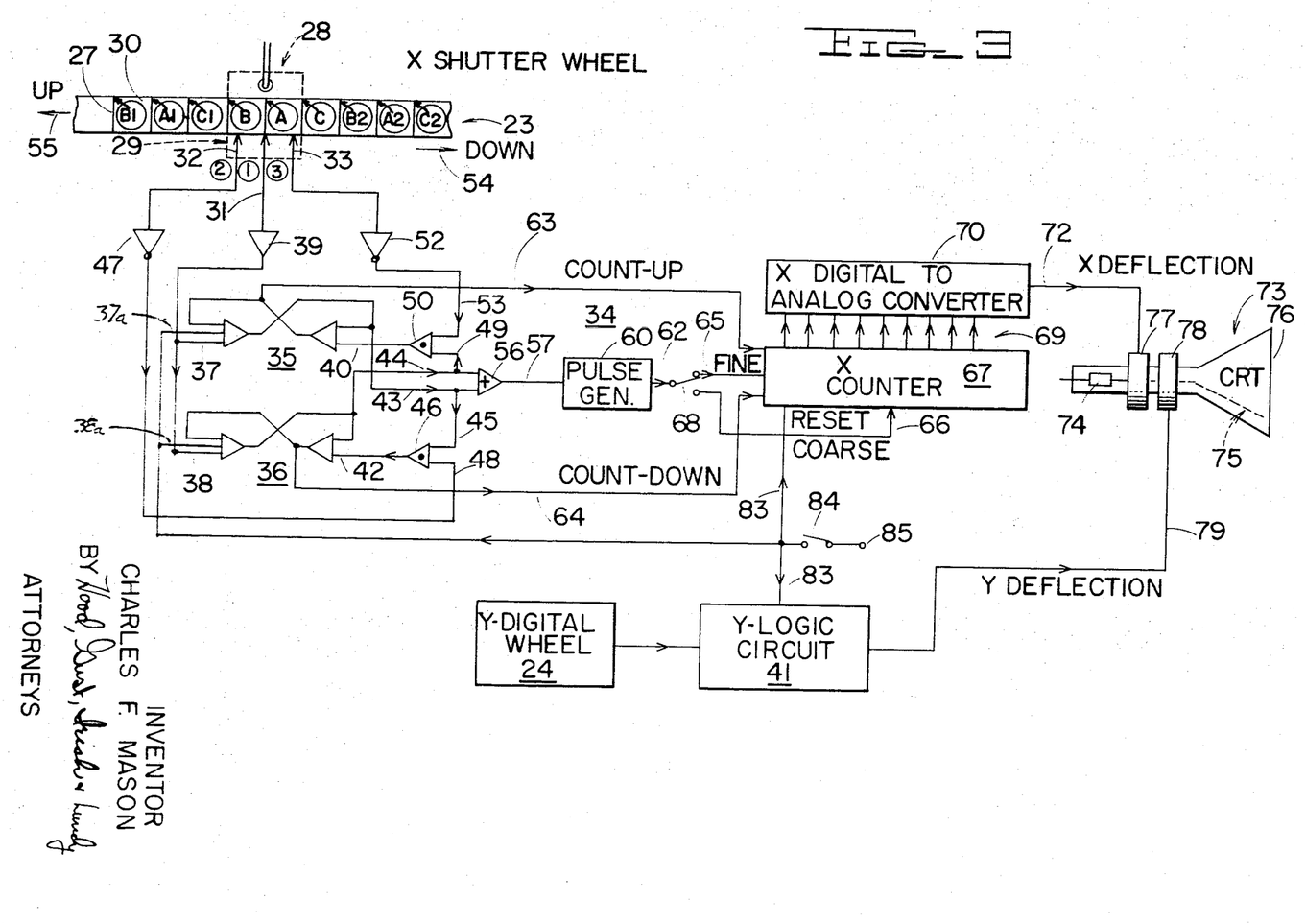
FIG. 3 is a schematic diagram illustrating one embodiment of the cursor control system of the invention.

Referring now to FIG. 3, the "X" digital or shutter wheel 23 is shown in developed form with light source 28 schematically shown on one side thereof and photodiode assembly 29 on the other so that light provided by light source 28 is transmitted through the transparent portions 30 of wheel 23 and shielded by lines 27. Photodiode assembly 29 comprises three conventional photodiodes 31, 32 and 33 coupled to X logic circuit 34. The photodiodes 31, 32 and 33 of assembly 29 associated with the Y shutter wheel 24 are coupled to an identical logic circuit 41, and it will thus suffice to describe only the X logic circuit. Photodiodes 31, 32 and 33 are equally spaced apart, this spacing being less than the spacing of opaque lines 27 on the respective digital wheel, as shown.

A pair of conventional bistable devices or flip-flops 35 and 36 are provided respectively having resetting input circuits 37 and 38, application of a suitable potential, in this case a negative-going pulse, to the input circuits 37 and 38 thus resetting the bistable devices 35 and 36 to their first stable state. The intermediate photodiode 31, referred to as diode "No. 1," is coupled to resetting input circuits 37 and 38 of bistable devices 35 and 36 by a conventional amplifier 39. Thus, when photodiode No. 1 is aligned with an opaque line 27 on digital wheel 23, such as the line A, it is shielded from light source 28, and a negative-going pulse is supplied to resetting input circuits 37 and 38 thereby to reset both of the bistable devices 35 and 36.

Bistable devices 35 and 36 respectively have setting input circuits 40 and 42, application of a suitable signal, in this case again a negative-going pulse, to a setting input circuit 40 or 42 causing the respective bistable device 35, 36 to change or switch to its second or "set" stable state. Signal output circuits 43 and 44 are respectively coupled to bistable devices 35 and 36 and respectively have an output signal developed therein when the respective bistable device 35, 36 has been set to its set condition or state.

Output circuit 43 of bistable device 35 is coupled to the inhibit input circuit 45 of a convention NAND gate 46. Photodiode 32, referred to as diode "No. 2" is coupled by a convention amplifier 47 to the signal input circuit 48 of gate 46, which has its output circuit coupled to the setting input circuit 42 of bistable device 36. Likewise, output circuit 44 of bistable device 36 is coupled to the inhibit input circuit 49 of conventional NAND gate 50. Photodiode 33, referred to as diode "No. 3" is coupled by conventional amplifier 52 to gating signal input circuit 53 of gate 50 which has its output circuit coupled to setting input circuit 40 of bistable device 35.

It will now be seen that if digital wheel 23 is moved from the position as shown in FIG. 3 in the "down" direction, as shown by arrow 54, sufficiently to bring photodiode No. 2 into registry with line B, thereby shielding diode No. 2 from light source 28, pulse will be applied to gate 46. Assuming that bistable device 35 has not been switched to its set or second stable state so that no output signal appears in its output circuit 43, and thus no inhibiting signal is applied to inhibit input circuit 45 of gate 46, the signal applied to input circuit 48 of gate 46 will be passed therethrough and applied to the setting input circuit 42 of bistable device 36, thereby setting the same to its set condition or state with an output signal thus appearing in its output circuit 44 and an inhibiting signal being applied to inhibit input circuit 49 of gate 50, thus inhibiting that gate.

It will likewise be seen that if wheel 23 is moved from the position shown in FIG. 3 in the "up" direction, as shown by the arrow 55, opaque line C will move into registry with photodiode 33, thereby shielding the same from light source 28, and a pulse will therefore be developed in input circuit 53 of gate 50. With both bistable devices 35, 36 in their "reset" states as a result of the signal previously applied to resetting input circuits 37, 38 by photodiode 1 as above described, no inhibiting signal will have been applied to inhibit input circuit 49 of gate 50, and thus the signal appearing in input circuit 53 will be passed through gate 50 and applied to setting input circuit 40 of bistable device 35, thereby switching the same to its second or "set" stable state. Setting of bistable device 35 results in an output signal in its output circuit 43 and an inhibiting signal in inhibit input circuit 45 of gate 46, thereby inhibiting that gate to prevent subsequent setting of bistable device 36 until bistable device 35 has been reset by a resetting signal applied to its resetting input circuit 37.

Output circuits 43 and 44 of bistable devices 35 and 36 are respectively coupled to the input circuits of OR gate 56, which has its output circuit 57 coupled to pulse generator 60. It will thus be seen that each time either photodiode No. 2, or photodiode No. 3 is in registry with a respective opaque line 27 on wheel 23, thus sensing passage of such line, one of the bistable devices 35, 36 will be switched from its "reset" to its "set" state resulting in generation of one pulse by pulse generator 60. It will further be seen that once both bistable devices 35, 36 have been reset by photodiode No. 1 being in registry with a respective opaque line 27, thus sensing passage thereof, they will remain in the "reset" state until one or the other has been "set" by the sensing of the passage of an adjacent opaque line 27 by one or the other of the photodiodes Nos. 2 and 3, and thus the subsequent movement of a particular line A back and forth across photodiode No. 1, as caused by vibration, will have no effect upon bistable devices 35, 36. Likewise, once one or the other of the bistable devices 35, 36 has been "set," it will remain in the "set" state until it is reset by the application of a resetting pulse to the respective resetting input circuit 37, 38 in response to the subsequent sensing of the passage of an opaque line 27 by photodiode No. 1. Finally, it will be observed that bistable device 35 is "set" only when wheel 23 is moved in the "up" direction 55, and that bistable device 36 is "set" only when wheel 23 is moved in the "down" direction 54, i.e. both bistable devices 35, 36 are never simultaneously "set."

A "count-up" output circuit 63 is coupled to bistable device 35 and a signal is provided therein in response to setting of that bistable device. Likewise, a "countdown" output circuit 64 is coupled to bistable device 36 and has a signal provided therein in response to setting of that bistable device. It will now be seen that a single pulse is provided in output circuit 62 of pulse generator 60 whenever photodiode No. 2 or photodiode No. 3 senses passage of a respective opaque line 27 in the downward or upward direction, respectively, and that a signal is provided in the respective count-up or count-down circuit 63, 64 indicating the direction of movement of wheel 23.

Output circuit 62 of pulse generator 60 is coupled to "fine" and "coarse" input circuits 65, 66 of X counter by switch 68. Counter 67 is a conventional "up-down" pulse counter which cumulatively counts the pulses applied thereto by pulse generator 60 in the up and down direction. "Count-up" and "countdown" output circuits 63, 64 are coupled to pulse counter 67 and the signals respectively therein determine the up and down counting direction of counter 67. Thus, with the "countdown" circuit 64 energized, application of 10 pulses from pulse generator 60 to counter 67 will result in counting down the 10 pulses. Assuming then that the "countdown" circuit 64 is deenergized and the "count-up" circuit 63 is energized and one additional pulse is applied to counter 67 by pulse generator 60, the counter will count-up by one pulse thereby reducing the cumulative countdown pulse count therein by one pulse to provide a net countdown pulse count of nine.

The X pulse counter 67 is provided with a plurality of digital output circuits 69 respectively having signals provided therein indicating the cumulative up or down count in the counter in conventional fashion. Digital output circuits 69 of counter 67 are coupled to a conventional digital-to-analog converter 70 which provides in its output circuit 72 an analog signal responsive to the cumulative count in counter 67.

In the illustrated embodiment, the cursor display is provided by a conventional cathode ray tube 73 having an electron gun 74 which directs an electron beam 75 toward display screen 76. Beam 75 is deflected in X and Y coordinates across display screen 76 by conventional X and Y deflection yokes 77, 78. Output circuit 72 of the X digital-to-analog converter 70 is coupled to the X deflection yoke 77. Input circuit 79 of the Y deflection yoke 78 is coupled to the output circuit of the corresponding Y digital-to-analog converter 70 of the Y logic circuit 41 associated with the Y digital wheel 24.

In a typical application, X and Y deflection voltages are provided by the respective digital-to-analog converters 70 normally to position beam 75 at the center of display screen 76. Thus, a cumulative "up" count in the X counter 67 will result in deflection of the beam 75 a corresponding distance to the right of the center of the screen in the X-axis while a cumulative "down" count will result in a corresponding deflection of the beam to the left of center on the X-axis. Likewise, a cumulative "up" count in the Y counter will result in upward deflection of beam 75 from the center in the Y-axis while a cumulative "down" count will result in a corresponding deflection downwardly from the center in the Y-axis. It will be readily apparent that cumulative up or down counts in both the X and Y counters 67 will result in corresponding deflection of beam 75 across display screen 76 from its centered position in X and Y coordinates to a corresponding position on the display screen.

It will now be seen that with both bistable devices 35, 36 reset in response to the sensing by photodiode No. 1 of passage of opaque line A of wheel 23, movement of the wheel in the down direction 54 will result in photodiode No. 2 sensing passage of line B resulting in the production of a "countdown" signal in line 64 and one pulse generated by pulse generator 60 applied to counter 67 which thus counts-down one pulse. Continued movement of wheel 23 in the down direction will result in photodiode No. 1 sensing passage of line B thus resetting both bistable devices 35, 36 and terminating the countdown signal. Further movement of wheel 23 in the down direction will result in photodiode No. 2 sensing passage of line C1, thus again setting bistable device 36, a second pulse being generated by pulse generator 60 and applied to counter 67, and a countdown signal again being provided in output circuits 64 so that a cumulative down count of two is provided in counter 67. Thus, as wheel 23 continues to move in the down direction 54 photodiodes Nos. 2 and 1 will continue successively and sequentially to sense passage of lines C1, A1 and B1, thus successively and sequentially setting and resetting bistable device 36, resulting in a total downcount of four in counter 67.

Now, assuming that photodiode No. 1 is in registry with line B1 and that the bistable device 36 has thus been reset (bistable device 35 having remained in its "reset" state despite the sensing of the passage of lines A, B, C1 and A1 by photodiode No. 3 by virtue of the inhibiting of gate 50), if wheel 23 is moved in the up direction 55, photodiode No. 3 will sense passage of line A1, thus setting bistable device 35 resulting in provision of a count-up signal in line 63 and generation of another pulse by pulse generator 60, counter 67 now counting up one pulse to provide a net down pulse count of three therein.

It will be observed that unlimited rotation of ball 11 is provided about either of its X- and Y-axes 14, 17, i.e. ball 11 may be selectively, manually rotated any number of complete turns about either of both axes. However, a predetermined cumulative rotation of ball 11 about either of its axes, which may be more than one turn or even several turns, will result in deflection of beam 75 in cathode ray tube 73 to the edge of display screen 76. With a binary counting chain employed for counter 67, and with the highest count of the counter being that which will cause deflection of beam 73 to the edge of screen 76, further rotation of ball 11 in the same direction so as to generate one additional pulse from pulse generator 60 would result in the counter 67 returning to a "zero" count, with the beam thus immediately returning to the centered location, or the other side of the screen, as the case may be.

It may be desirable, however, once the beam 75 has been deflected to an edge of screen 76, to terminate further application of pulses to counter 67 unless and until the rotation of the ball 11 about the same axis is reversed, and then merely to return the beam toward the center or opposite edge in response to reverse rotation of the ball, rather than immediately to return the beam to the center or opposite edge, as above described. Referring now to FIG. 7 of the drawings, a "last-count" circuit is shown which may be employed in conjunction with the counter of FIG. 6. Here, the "$\bar{Q}$" outputs, all of which have a "one" signal level therein in response to a "zero" count, are coupled to "down" AND gate 59, while the "Q" outputs, all of which have a "one" signal therein in response to the highest count are coupled to "up" AND gate 58. The "up" and "down" output circuits 63, 64, and the output circuits of gates 58, 59 are coupled to NAND gates 61, 81 respectively. Output circuit 62 of pulse generator 60 is coupled to both gates 61, 81. The outputs of gates 61, 81 are coupled by OR gate 82 to pulse input circuits 65 or 66 of counter 67. It will be seen that with the counter 67 counting "up," appearance of a "last-count" signal in the output circuit of gate 58 will inhibit gate 61, so that no further clock pulses will be passed to counter 67 so long as an "up" signal remains in circuit 63, gate 81 being inhibited by the absence of a "down" signal in circuit 64. Thus, the beam 75 will remain at one edge of the screen, despite further rotation of ball 11 in the "up" direction. Now, if ball 11 is rotated in the "down" direction, a "down" signal will appear in circuit 64 which enables gate 81 so that clock pulses are again passed to counter 67 which thus counts "down" from its higher count with beam 75 being correspondingly deflected away from the respective edge. Operation of the "last-count" circuit at the "zero" count is identical.

In the fine count mode of operation of counter 67, with switch 68 coupling output circuit 62 of pulse generator 60 to the "fine" input circuit 65 of counter 67, each pulse provided by pulse generator 60 advances counter 67 by one least significant bit. In the coarse mode with switch 68 coupling the "coarse" input circuit 66 to pulse generator 60, each pulse advances a predetermined higher order least significant bit, such as the fourth, of the counter 67 by one count. Thus, the cursor beam 75 is moved across display screen 76 eight times as fast (assuming selection of the fourth least significant bit) for a given rotational movement of ball 11 in the coarse mode as in the fine mode.

Since ball 11 has no predetermined positional relationship with respect to the position of cursor beam 75 on display screen 76, unless, of course, ball 11 is never rotated a sufficient amount to move beam 75 to the edge of the screen to provide a last-count signal, it is desirable to provide for immediate selective resetting of bistable devices 35, 36 and resetting of counter 67 to its initial or zero count. Each of the X and Y counters 67 has a resetting input circuit 83. A switch 84 selectively couples a suitable source of potential 85 to both resetting circuits 83 of both of the X and Y counters 67 to both the resetting circuits 37a, 38a of the bistable devices 35, 36 of both of the X, Y logic circuits 34, 41, resulting in immediate resetting of both bistable devices 35, 36 and the counter 67 of both logic circuits 34, 41, thereby immediately centering the cursor beam 75 without respect to the particular rotational position of ball 11. Thus, subsequent rotational movement of ball 11 away from the position in which it was located at the time of resetting will again result in corresponding deflection of the cursor beam 75, as above described.

Figure 4:
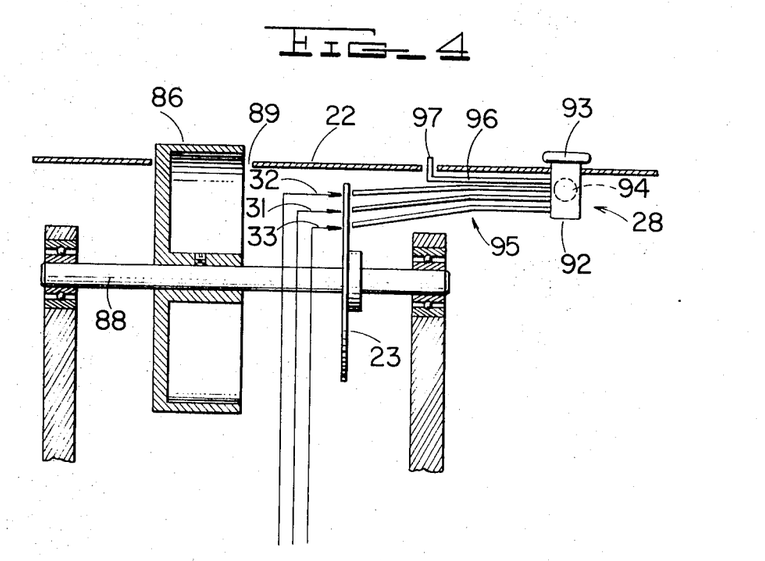
FIG. 4 is a side cross-sectional view illustrating another embodiment of the control element of the invention.
Figure 5:
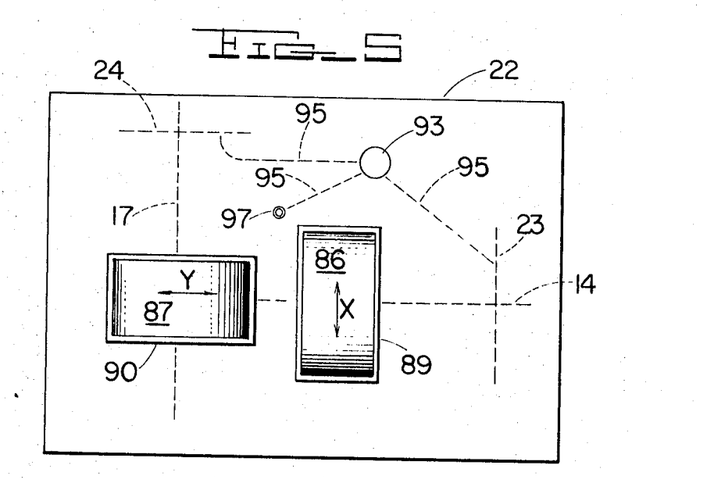
FIG. 5 is a top view showing two control elements of the type shown in FIG. 4

Referring now to FIGS. 4 and 5 in which like elements are indicated by like reference numerals, the single roll ball control element 11 of the previous embodiment may be replaced by two, separate, manually rotatable X and Y control wheels or drums 86 and 87. Since the control wheels 86, 87 and their associated digital wheels and light sources are identical, detailed description of one will suffice.

Each of the control wheels 86, 87 is secured to a rotatable shaft 88, the shafts 88 and respective wheels 86, 87 being respectively rotatable about the X- and Y-axes 14, 17. Digital wheels 23 and 24 are respectively secured to shafts 88 and rotatable therewith and with the respective control wheel 86, 87. In this embodiment, control wheels 86, 87 are shown as disposed at right angles to each other and projecting upwardly through openings 89, 90 in top panel 22. It will be readily understood that the two control wheels 86, 87 need not be disposed at right angles, but on the contrary be disposed with the respective X- and Y-axes 14, 17 in parallel relationship. A single light source 28 is provided in a housing 92 mounted on panel 22, housing 92 having a removable cover 93 disposed on the upper side of panel 22 thereby providing for ready replacement of the light bulb 94. Light is conveyed from light source 28 to one side of the digital wheel 23, 24 by suitable fiber-optics rods 95, the photodiodes 31, 32 and 33 being disposed on the other side of the digital wheels, as in the case of the previous embodiment. Another fiber-optics rod 96 may be provided extending from light source housing 92 and having its end 97 projecting upwardly through an opening in panel 22 in order to provide an indication to the operator that the light source is operative. It will be readily understood that the three photodiodes 31, 32 and 33 respectively associated with the X and Y digital wheels 23, 24 are coupled to the X and Y logic circuits 34, 41 as shown in FIG. 3 and that the operation of the system is otherwise identical.

Figure 6:
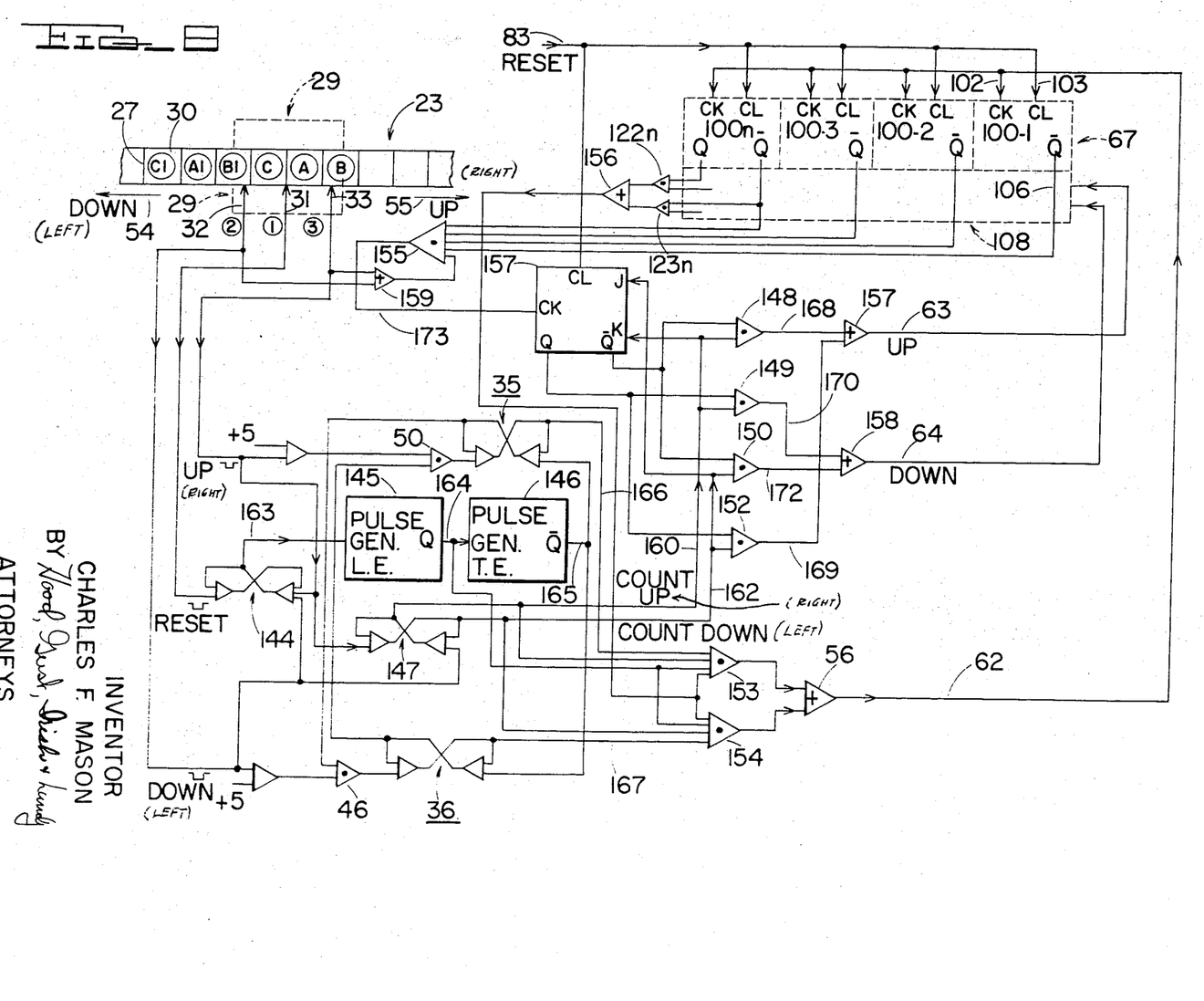
FIG. 6 is a schematic diagram illustrating an up and down pulse counting system usable in the system of the invention.
Figure 7:
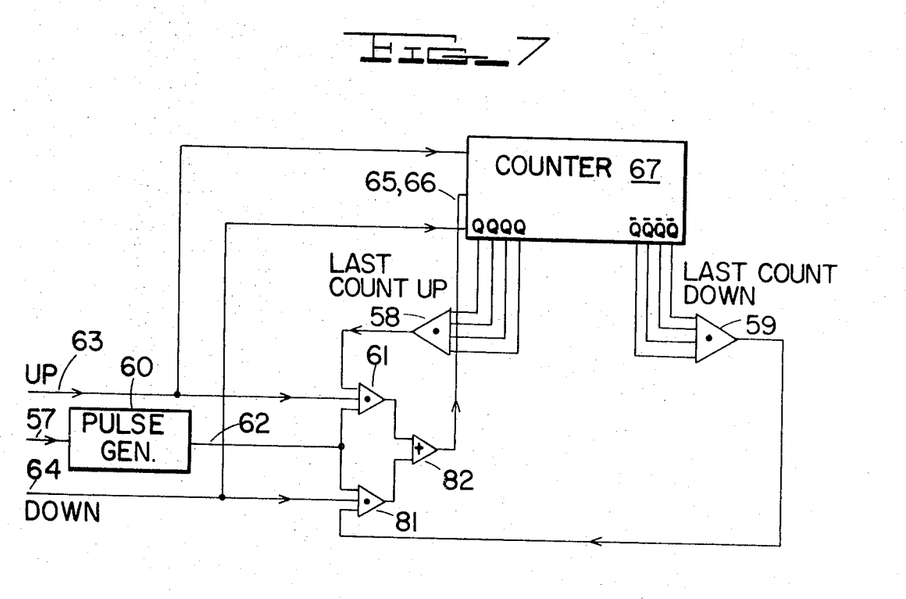
FIG. 7 is a fragmentary schematic diagram illustrating an addition to the system of FIG. 3.

Referring now to FIG. 6 of the drawings, there is shown schematically one form of register circuit which can be employed for the X, Y counters 67. The register circuit basically comprises a bistable counting chain including a plurality of bistable devices or flip-flops 100, only four of which are shown. In a specific embodiment, nine such bistable devices 100 are provided in the counting chain thereby permitting counting to the ninth least significant bit. Bistable devices 100 are conventional micrologic elements and need not be described in detail. Here, output circuit 62 of pulse generator 60 is coupled to trigger or "clock" signal input circuit 102 of each bistable device 100, designated "CK." A clearing input circuit 103, designated "CL," is provided for each of the devices 100. Each of the devices 100 has an enabling input circuit 104, designated "JK" and "one" and "zero" output circuits 105, 106, designated as "Q and $\bar{Q}$," respectively. Thus, each pulse applied to the trigger signal input circuit 102 of a bistable device 100 will cause the device to change from one of its stable states to its other stable state, provided a "one" enabling signal is applied to its input circuit 104, the presence or absence of an enabling signal in the JK circuit of any given device 100 depending upon the states of all the lower order stages of the chain. Q and $\bar{Q}$ output circuits 105, 106 of the bistable devices 100 comprise the digital outputs 69 which are coupled to the digital-to-analog converter 70.

The count-up and countdown signal circuits 63, 64 are respectively coupled to chains 107, 108 of AND gates which determine whether or not an enabling signal is applied to the JK input circuits 104 of the bistable devices 100 thus, to determine the direction of counting. Thus, count-up circuit 63 is coupled to the input circuit 109 of gate 110 which has the Q output circuit of bistable device 100-1 coupled to its other input circuit 112, while countdown circuit 64 is coupled to input circuit 113 of gate 114 which has the $\bar{Q}$ output circuit of device 100-1 coupled to its other input circuit 115. Thus, presence of a "one" count-up signal in circuit 63 will enable gate 110 so that when the Q output of bistable device 100-1 is "one," device 100-2 is enabled through gates 110 and 117. Device 100-2 will then change state with the next input pulse from pulse generator 60, to increase the count of the counter by one. Conversely, a countdown "one" signal in circuit 64 will enable gate 114 so that when the $\bar{Q}$ output of device 100-1 is "one," device 100-2 is enabled through gates 114 and 117. Device 100-2 will thus again change state with the next input pulse, to decrease the count of the counter by one. Output circuits 116, 118 of gates 114, 110 are also coupled by amplifiers 119, 120 to gates 122, 123 of the second stage.

The coarse-fine control circuit 124 provides for bounce elimination during the coarse-fine selection, and also an OR function for resetting the lower order counting stages 100-1, 100-2 and 100-3. Circuit 124 includes a bistable device or flip-flop 125 having a coarse setting input circuit 126 and a fine setting input circuit 127 respectively coupled to the opposite sides of switch 68, which has its movable element connected to ground, as shown. Resistors 128, 129 are serially connected across circuits 126, 127 with their midpoint 130 being connected to a suitable source of potential, such as plus five volts, as shown. "Fine" output circuit 132 of bistable device 125 is coupled to the inhibit circuit 133, 134 of gates 135, 136, thus inhibiting those gates when switch 68 is in the "Fine" position. Count-up and countdown circuits 63, 64 are respectively coupled to the gating signal input circuits 137 and 138 of gates 135, 136. Coarse output circuit 139 of bistable device 125 is coupled to OR gate 140 which has its output circuit 141 coupled by NAND gate 142 to the reset or clearing input circuits 103 (CL) of the lowest order devices 100-1, 100-2 and 100-3. Thus, movement of the coarse-fine selector switch 68 to its "coarse" position will cause bistable device 125 to switch to its coarse stable state thereby energizing coarse output circuit 139 and applying a potential to the clearing circuits CL of the first three stages 100-1, 100-2 and 100-3. Switching of device 125 to its coarse stable state removes the potentials from the "fine" output circuit 132, thus removing the inhibiting potentials from gates 135, 136 so that the count-up or countdown signals, as the case may be, in lines 63, 64 are gated through gates 135, 136 to OR gate 143, which is coupled to the JK input circuit 104 of the fourth order stage 100-4.

With the coarse-fine or sensitivity control switch 68 in its "fine" position, all of the stages 100 of register 67 are connected as an up-down counter with each pulse applied to circuit 62 by pulse generator 60 advancing the counter by one least significant bit, up or down, as the case may be, as determined by the signal in the respective count-up and countdown circuits 63, 64. With switch 68 moved to its "coarse" position, the first three stages, 100-1, 100-2 and 100-3 are cleared and are essentially bypassed so that the count increase and count decrease signals make the fourth stage 100–4 act as the least significant bit of the counter.

Reset input line 83 is directly coupled to the reset or clearing circuit 103 (CL) of stage 100–4 and the higher order stages (not shown) through 100–n. Reset circuit 83 is also coupled to OR gate 140 so that a reset signal is supplied thereby through gate 142 to clear the three lower order stages 100–1, 100–2 and 100–3.

It will be recognized that the binary counting chains or register shown in FIG. 6, when employed as the counter 67 in the system of FIG. 3, since it merely counts "up" from or "-down" toward a "zero" count, will merely actuate the digital-to-analog converter 70 to provide a corresponding deflection of electron beam 75 in one axis in one direction away from, or in the opposite direction toward an initial or reference beam position. Thus, the counter shown in FIG. 6, when employed as the counter 67 in the system of FIG. 3, would deflect the electron beam 75 from a point such as the left edge of the display screen 76, toward the right side, in the X-axis, in response to "up" pulses, or from the right side toward the left side in response to "down" pulses; register 67 per se will not provide for "up" and "down" deflection of beam 75 on either side of an initial, centered position on the display screen.

Further, while the spacing of the photodiodes 31, 32 and 33 with respect to the spacing of the opaque lines 27 on the digital wheel 23 as shown in FIG. 3 is such that the "bounce" effect is eliminated when the digital wheel is oscillated so that one line 27 moves back and forth across a respective photo diode, it will be observed that oscillating the digital wheel, either inadvertently or intentionally, a sufficient amount to move two adjacent lines back and forth past the reset photodiode No. 1 will result in advancement or "walking" of the cursor beam across the screen, despite the fact that the wheel has not been rotated a corresponding distance in a given direction.

In order to provide a system in which such oscillation of a digital wheel by two lines will not "walk" the cursor beam across the screen, thus broadening the "bounce" elimination capability of the system, and also to provide for deflection of the beam in either direction on either side of an initial centered position, the system shown in FIG. 8 is provided in which like elements are indicated by like reference numerals.

Here it will be observed that the three photodiodes 31, 32 and 33 are spaced apart by distances greater than the spacing of the opaque lines 27 on the digital wheel 23 so that, with the No. 1 diode aligned with the opaque line A, diode No. 3 is spaced from line B in the side thereof remote from line A, and similarly diode No. 2 is spaced from line C on the side thereof remote from line A. In this specific configuration, with the same arrangement of the No. 1, 2 and 3 diodes, the directions 54, 55 of "down" and "up" movement of digital wheel 23 are reversed from that shown in FIG. 3.

Diode No. 1 is coupled to the "reset" input circuit of bistable device or toggle 144. The "down" diode No. 2 is coupled by NAND gate 46 to the "set" input circuit of bistable device 36, and also to the "set" input circuits of bistable devices 144 and 147. The "up" diode No. 3 is coupled by NAND gate 50 to the "set" input circuit of bistable device 35, and also to the "set" input circuit of bistable device 144 and the "reset" input circuit of bistable device 147. The "count-up" output circuit 160 of bistable device 147 is coupled to NAND gates 148 and 149, to NAND gate 153, and also to the "K" enabling circuit of bistable device 157. The "countdown" output circuit 162 of bistable device 147 is coupled to NAND gates 150 and 152, to NAND gate 154, and also to the "J" enabling circuit of bistable device 157.

Output circuit 163 of the reset toggle 144 is coupled to leading edge pulse generator 145, which has its output circuit 164 coupled to trailing edge pulse generator 146 and also to NAND gates 153 and 154. Output circuit 165 of pulse generator 146 is coupled to the "reset" input circuits of the "up" and "down" bistable devices 35, 36. Output circuits 166 and 167 of bistable devices 35 and 36 are respectively coupled to NAND gates 153 and 154.

Output circuits 168 and 169 of NAND gates 148 and 152 are coupled by OR gate 157 to the "up" output circuit 63, output circuits 170 and 172 of NAND gates 149 and 150 are coupled by OR gate 158 to the "down" output circuit 64, circuits 63 and 64 being coupled to the "up" and "down" NAND gate chain 108 of counter 67, as shown in FIG. 6. The "Q" output circuit of bistable device 157 is coupled to NAND gates 149 and 152, and the "$\overline{Q}$" output circuit is coupled to NAND gates 148 and 150. NAND gates 153 and 154 are coupled by OR gate 56 to the pulse output circuit 62, which is coupled to the triggering input circuits "CK" of the bistable devices 100 of counter 67, as shown in detail in FIG. 6.

The highest order NAND gates 122–n and 123–n of chain 108 of counter 67 are coupled by OR gate 156 to both NAND gates 153 and 154. All of the "Q" outputs of the bistable devices 100 of counter 67 are coupled to NAND gate 155. The "down" diode No. 2 and the "up" diode No. 3 are coupled by OR gate 159 to NAND gate 155, which has its output circuit 173 coupled to the triggering input circuit "CK" of bistable device 157 by an inverter (not shown). Manual "reset" input circuit 83 is coupled to the clearing input circuits "CL" of the bistable devices 100 of counter 67, as shown in detail in FIG. 6, and also to the clearing input circuit "CL" of bistable device 157.

It will be recognized that if the cursor beam 75 is to have an initial, centered position on the display screen with a "zero" count, and if a counter of the type shown in FIG. 6 is to be employed, assuming deflection of the beam in the "X"-axis, if the beam is to be deflected toward the left from the centered position in response to "left" movement of ball 11 (FIG. 2), counter 67 must be connected to count-up in order to deflect the beam from the centered position toward the left edge of the screen, and conversely to countdown to deflect the beam from the left of the screen to the right toward the centered position in response to "right" rotation of ball 11 about its "X"-axis. If then the beam is to be deflected toward the right from its centered position in response to further rotation of ball 11 toward the "right," counter 67 must be connected to "count-up" in order to deflect the beam from the centered position toward the right side of the screen, and to countdown to deflect the beam from the right of the screen toward the centered position in response to "left" rotation of ball 11. Thus, the "up" and "down" connections to counter 67 must be reversed at the centered position of the beam in order to permit the beam to be deflected in either direction away from and toward the centered position. Bistable device 157 provides this "right or left" switching of the "up" and "down" connections to the counter when the "$\overline{Q}$" outputs of all stages of the counter 67 are all "one, " thus indicating a "zero" count in the counter.

In order to prevent "walking" of the cursor beam across the screen in response to oscillating the respective digital wheel 23, 24 back and forth so that the No. 1 diode and either the No. 2 or the No. 3 diodes successively and sequentially reset and set one or the other of the "up" (right) and "down" (left) bistable devices 35, 36, toggle 144 is "reset" by photodiode No. 1 in response to passage of line A, thus causing pulse generator 145 to generate a pulse which is applied to NAND gates 153 and 154, and causing pulse generator 146 to generate a resetting pulse which is applied to the "right" and "left" bistable devices 35, 36 to reset the same. Assuming now that the cursor beam 75 has previously been deflected leftward from the centered position and has been moving to the right toward the center, toggle 147 will have been most recently "reset" (and toggle 144 "set") by diode No. 3 sensing passage of line B in response to movement of wheel 23 in the "up" direction 55. Also, device 35 will have been set through gate 50 to inhibit gate 46. Continued movement of wheel 23 in the "up" direction 55 will result in photodiode No. 2 sensing passage of line B1 thereby setting toggle 147. However, gate 46 inhibits setting of device 36. An output signal from bistable device 35 is thus applied to NAND gate 153 and a "count-up" or right signal is applied from toggle 147 to NAND gates 148, 149. Recalling that the beam 75 has previously been to the left of center and is now being moved to the right toward center, the counter is thus counting down, bistable device 157 having previously been switched to provide a "Q" output of "one." Gate 149 is thus enabled and gate 158 thus passes a "down" signal in "down" line 64. However, at this point no pulse is provided by pulse generator 145 and thus, neither gates 153 or 154 is enabled so that no counting or clock pulse is provided in pulse output circuit 62.

Still further movement of disc 23 in the "right" direction 55 results in the resetting diode No. 1 sensing passage of line C, thus resetting toggle 144 and actuating pulse generator 145 to apply a "one" pulse to gates 153, 154. Recalling that pulse generator 146 is a trailing edge pulse generator, i.e. a pulse is generated in response to the trailing edge of the pulse generated by pulse generator 145, the bistable device 35 is still set, thereby still applying a signal to gate 153, and toggle 147 is still "set" from the previous "left" pulse provided by photodiode No. 2, likewise applying a signal to gate 153. Thus, the resetting pulse generated by pulse generator 145 and applied to gate 153 results in passage of a pulse through gate 56 to pulse output circuit 62, that pulse being applied to the "CK" input circuits of the counter stages 100, thereby to decrease the count therein by one count.

It will now be seen that in order to provide a clock or counting pulse to the counter 67, assuming movement of wheel 23 in the "right" direction 55, it is necessary sequentially to provide a reset pulse (diode No. 1), a count-right pulse (diode No. 3), a count-left pulse (diode No. 2) and finally another reset pulse (diode No. 1). Conversely, if wheel 23 is being moved in the "left" direction 54, in order to provide a clock or counting pulse in pulse output circuit 62, it is necessary sequentially to provide a reset pulse, a count-left pulse, a count-right pulse, and another reset pulse. Thus, it will be seen that cursor beam 75 cannot be "walked" across the screen by merely oscillating the wheel so that the reset photodiode No. 1 and one or the other of the "down" or "up" photodiodes Nos. 2 and 3 sequentially and successively sense passage of a given pair of adjacent lines. On the contrary, it is necessary that the wheel 23 be moved sufficiently so that the reset photodiode No. 1 has sequentially sensed the passage of two other lines in the proper sequence. Thus, the "bounce" elimination characteristics of the system have been substantially broadened. Further, if the wheel 23 is oscillated forward and back a sufficient amount to generate a clock pulse, the movement of the disc in one direction will result in generation of the pulse to deflect the beam a corresponding amount in one direction, and the reverse motion will result in generation of another pulse which will return the beam in the opposite direction to its initial position. Thus, "bounce" due to oscillatory movement of the digital wheel or disc by any amount cannot result in "walking" of the cursor beam 75 across the screen.

With "one" signals applied to gate 155 by all of the "$\overline{Q}$" output circuits of stages 100 of counter 67, continued movement of wheel 23 in the "right" direction 55 will result in the "right" photodiode No. 3 sensing passage of line B. Further rotation causes the "left" photodiode No. 2 to be energized. This sends a pulse through gate 159 to enable gate 155, which thus passes a pulse to the "CK" trigger input circuit of bistable device 157 to cause it to switch to the right screen state since the "K" input will be "one" and the "J" input will be "zero." This will cause the "Q" output of device 157 to become a "zero" at the trailing edge of the pulse from circuit 173. This indicates that the right side of the screen is now in use, and further movement to the right should cause an "up" count in the counter 67. This reverses the "Q" and "$\overline{Q}$" inputs to gates 148, 149, 150, 152 from the previous condition. Further movement of wheel 23 until the resetting diode No. 1 senses passage of line C results in provision of a counting or clock pulse in pulse output circuit 62, so that the counter 67 now counts up in response to movement of digital wheel 23 in the "up" direction 55, thereby to deflect the electron beam 75 to the right away from the centered position and toward the right side of the screen. Subsequent movement of the wheel 23 in the "left" direction results in a "down" signal applied to the counter thereby to return the beam 75 toward its centered position, downward or leftward movement of ball 11 and wheel 23 past the "zero" count again resulting in switching of bistable device 157 so that the counter now again counts up to move the beam toward the left or down away from the centered position.

Assuming now that the last movement of wheel 23 in the "right" direction 55 so that the reset photodiode No. 1 senses passage of line C thereby to generate a clock pulse in pulse output circuit 62 resulted in the counter 67 reaching a "zero" count, all of the "Q" outputs of the counter stages 100 will have a "one" signal therein applied to gate 155. Prior to the counter reaching the "zero" count, gate 123–$n$ of the chain 108 will be disabled, which through OR circuit 156 and an inverter (not shown) enables gates 153, 154 to pass clock pulses as long as the counter is counting "down." Upon reaching the "zero" count gate 123–$n$ is enabled, which disables gates 153 and 154, thus preventing the application of further "down" clock pulses if the counter is to count "down." Gate 123–$n$ will be disabled, however, and allow clock pulses to be applied to the counter if it is to count "up."

Similarly, gate 122–$n$ is connected to the "Q" outputs of counter 67, and through gate 156 (and an inverter) to gates 153, 154, to prevent clock pulses being applied to the counter when it has a maximum count therein, and more "up" counts are generated. At the maximum count condition, gate 122–$n$ is disabled if a "countdown" condition exists, and allows clock pulses to pass to the counter. Gates 122–$n$, 123–$n$ thus prevent the counter from recycling at either the "zero" or maximum count condition, automatically stopping the counter at the maximum or minimum count, and yet allowing it immediately to start counting "up" from the "zero" state, or down from the maximum state. It will be observed that the maximum count gates 122–$n$ and minimum count gate 123–$n$ are "ORed" together, thus providing the above-described operation.

While light source 28, transparent digital wheels 23, 24 having opaque lines 27 thereon, and photodiodes 31, 32 and 33 have been shown, it will be readily understood that other devices for sensing passage of an actuating element on a member moved responsive to motion of the ball 11, or a respective wheel 86, 87, may be employed. Thus, a plurality of spaced magnets may be mounted on the digital wheel employed to actuate three reed-type switches. Similarly, a single magnet having a plurality of equally spaced pole pieces resembling gear teeth may be employed, again using three reed switches as sensing devices in conjunction therewith. It will be readily understood that inductive pickup coils may be employed as sensing devices in lieu of reed-type switches. Further, spaced cam surfaces may be provided on the digital wheel for successively and sequentially actuating three microswitches employed as the sensing devices.

Further, while discs 23, 24 have been shown with the opaque actuating lines 27 thereon, it will be understood that this portion of the system may readily be reversed with the discs being opaque and having spaced slits or other light-transmissive openings formed therein. Still further, while the actuating elements in the form of opaque lines 27 have been shown as being carried by the transparent digital wheels 23, it will be readily understood that the actuating elements in any of the forms described above may be carried by an elongated member which is moved longitudinally in opposite directions in response to rotation of ball 11 or the control wheels 86, 87.

Figure 9:
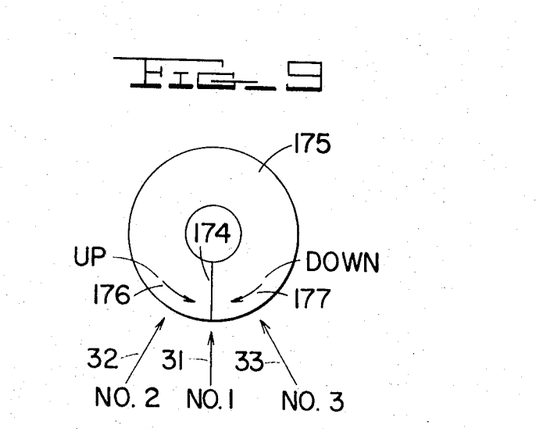
FIG. 9 illustrates a modified form of digital wheel usable in the system of the invention

Referring now briefly to FIG. 9 of the drawings, while digital wheels 23, 24 having a plurality of spaced opaque lines 27 thereon have been shown, it will be understood that a single opaque line 174 upon digital wheel 175 is the functional equivalent of the plurality of spaced lines 27 shown in the previous figures. Thus, with wheel 175 substituted for wheel 23 in the system of FIG. 9, and with wheel 175 rotated in the "up" direction 176, resetting diode No. 1 will first sense passage of line 174, and "up" photodiode No. 3 will then sense passage of the same line 174. After nearly a complete revolution of wheel 175, the "down" photodiode No. 2 will sense passage of the single line 174, and finally the resetting diode No. 1 will again sense passage of line 174, thereby providing the requisite, sequential, reset, count-up, count-down and reset pulses employed in the system of FIG. 8. It will be readily seen that the arrangement shown in FIG. 9 functions in a reciprocal manner when the wheel 175 is rotated in the "down" direction shown by the arrow 177.

While equal spacing of the opaque lines 27 on wheels 23, 24 have been shown in the drawings, it will be understood that the lines need not be equally spaced, it being only required that the three photodiodes provide the requisite resetting, "up" and "down" signals in the proper sequence. Further, while digital wheels 23, 24 have been shown respectively coupled to and rotated by ball 11 or wheels 86, 87, it will be readily understood that the actuating elements, whatever they may be, may be directly carried by the control element whether it be a ball, a wheel, or a linearly movable element.

Referring briefly again to FIGS. 4 and 5, it will be readily understood that a third "Z"-axis control wheel may be provided with an associated logics system thereby to provide a third "Z"-axis digital output signal. Also, further wheels may be added to control other characteristics of the cursor, such as its size and/or intensity.

It will now be seen that the system of the invention is characterized by its simplicity, lack of critical adjustments, and its completely digital operation. It will further be seen that solid-state devices, such as micrologic circuits, are employed throughout which require both low power and low voltage, such as 5 volts in a specific embodiment. It will be observed that the apparatus, by virtue of its inherent bounce-elimination characteristic, is vibration resistant and thus useful for airborne applications. The relatively expensive shaft encoders, critical gears, flopping shutters and slip clutches of prior systems are completely eliminated, thus reducing the overall cost of the system. Functionally, the system permits rapid reset of the cursor beam to the center of the screen, and can be readily expanded or contracted to any bit complexity desired.

While there have been described above the principles of this invention in connection with specific apparatus, it is to be clearly understood that this description is made only by way of example and not as a limitation to the scope of the invention.

What is claimed is:

1. Apparatus for indicating the magnitude and direction of movement of a member comprising: a control system including means for mounting said member for selective movement in forward and reverse directions, said member having at least one actuating element thereon; first, second and third spaced means for respectively sensing passage of an actuating element thereby, the first of said sensing means being intermediate said second and third sensing means, said sensing means having a spacing such that when said member is moved in one direction away from a position in which said first sensing means senses passage of an actuating element said second sensing means thereafter senses passage of an actuating element, and when said member is moved in the opposite direction away from said position said third sensing means thereafter senses passage of an actuating element; first and second bistable means for respectively generating a first signal responsive to sensing of passage in one direction of an actuating element by one of said second and third sensing means and for generating a second signal responsive to sensing passage in the opposite direction of an actuating element by the other of said second and third sensing means thereby respectively indicating the direction of movement of said member, means for inhibiting said first and second bistable means from generating said first and second signals except upon a predetermined sequence of sensing of passage in a given direction of an actuating element by two of said three sensing means, and means for generating an output signal in response to actuation of at least one of said sensing means and one of said bistable means.

2. The apparatus of claim 1 wherein said output signal generating means includes means for generating one output signal pulse in response to sequential actuation of said first sensing means and one of said second and third sensing means followed by the other of said second and third sensing means and thereafter said first sensing means when said member is moved in one direction.

3. The apparatus of claim 1 wherein said output signal generating means includes means for generating one output signal pulse in response to actuation of one of said second and third sensing means following actuation of said first sensing means when said member is moved in one direction.

4. The apparatus of claim 1 wherein said second generating means includes means for generating one output signal pulse in response to said actuation of at least one of said sensing means, and further comprising means for counting said pulses in up and down fashion, said counting means having a zero count therein with said member in a given position, means for coupling said first generating means to said counting means including means responsive to said zero count for actuating said counting means to count up and down, respectively, when said member is moved away from said given position in one direction and toward said given position in the opposite direction, and for actuating said counting means to count up and down, respectively, when said member is moved away from said given position in said opposite direction and toward said given position in said one direction.

5. The apparatus of claim 1 wherein said second generating means includes means for generating one output signal pulse in response to said actuation of at least one of said sensing means, and further comprising means coupled to said output signal generating means for cumulatively counting said pulses up and down in response to said first and second signals, respectively.

6. The apparatus of claim 5 wherein said counting means includes means for providing a digital readout of the cumulative count therein.

7. The apparatus of claim 6 further comprising a digital-to-analog converter coupled to said digital readout means thereby providing an analog output signal responsive to said digital readout.

8. The apparatus of claim 5 further comprising means responsive to said counting means reaching a predetermined count for inhibiting application of further pulses thereto.

9. The apparatus of claim 5 wherein said counting means includes first means for advancing the same by one least significant bit in response to each said pulse, and second means for advancing the same by a predetermined higher order bit in response to each said pulse, and further comprising means for selectively actuating said first and second advancing means.

10. The apparatus of claim 1 further comprising a source of radiation exposed to said member, said sensing means respectively comprising radiation responsive means, said member having at least one first portion adapted to direct radiation from said source to said radiation responsive means and at least one second portion adapted to shield said radiation responsive means from said source, said actuating element being one of said last-named first and second portions.

11. The apparatus of claim 10 wherein said source is disposed on one side of said member and said radiation responsive means are disposed on the other side, said first portion being radiation transmissive, said actuating element being said second portion.

12. The apparatus of claim 11 wherein said member comprises a disc of radiation-transmissive material, said mounting means including means for rotating said disc, said second portion comprising at least one radial, opaque line on said disc.

13. The apparatus of claim 1 further comprising a control element, means for mounting said element for selective rotation about an axis in forward and reverse directions, and means for moving said member in forward and reverse directions in response to rotation of said element in forward and reverse directions, respectively.

14. The apparatus of claim 13 wherein said rotatable element is a ball, said moving means including drive means engaging said ball and driven thereby for moving said member.

15. The apparatus of claim 14 wherein said drive means is a roller, said member comprising a disc coupled to said roller for rotation therewith.

16. The apparatus of claim 13 wherein said rotatable element is a wheel, said member comprising a disc coupled to said wheel for rotation therewith.

17. The apparatus of claim 13 further comprising second means for mounting said control element for selective rotation in forward and reverse directions about a second axis normal to said first-named axis, said first-named and second mounting means being adapted to permit simultaneous rotation of said element about both of said axes; and a second control system duplicative of the first-named control system, the moving means of said second system moving the respective member in response to rotation of said element about said second axis.

18. The apparatus of claim 17 wherein each of said first and second systems further include means for converting the respective output signals to analog signals having a magnitude and sign responsive to the amount and direction of rotation of said rotatable element about the respective axis.

19. The apparatus of claim 18 further comprising a display device having means for generating a cursor beam and means for deflecting said beam in X and Y coordinates, said converting means of said first and second systems being respectively coupled to said deflecting means whereby said beam is deflected in said coordinates responsive to the amount and direction of rotation of said element about the respective axis.

20. The apparatus of claim 19 wherein each of said converting means respectively include means for initially generally centering said beam on said display device with said rotatable element at an initial position, whereby rotation of said element about said axes away from its initial position results in deflection of said beam in the respective X and Y coordinates in either direction from its initial position responsive to the direction of rotation of said element.

21. The apparatus of claim 1 wherein said member has a plurality of said actuating elements thereon, said spacing of said sensing means being such that when said member is moved in said one direction away from said position in which said first sensing means senses passage of a first actuating element, said second sensing means thereafter senses passage of a second actuating element on one side of said first actuating element, and when said member is moved in the opposite direction away from said position, said third sensing means thereafter senses passage of a third actuating element on the other side of said first actuating element, and means for coupling one of said sensing means to both of said first and second bistable means.

22. The apparatus of claim 1 wherein said first and second bistable devices each have first and second means for switching the same between first and second stable states, first means for coupling said first sensing means to said first switching means of both of said devices for switching the same to their first stable states in response to sensing of passage of an actuating element by said first sensing means, second means for coupling said second sensing means to said second switching means of said first bistable device for switching the same to its second stable state in response to sensing of passage of an actuating element by said second sensing means, third means for coupling said third sensing means to said second switching means of said second bistable device for switching the same to its second stable state in response to sensing of passage of an actuating element by said third sensing means; first means responsive to switching of said first bistable device to its second stable state for inhibiting switching of said second bistable device to its second stable state, and second means responsive to switching of said second bistable device to its second stable state for inhibiting switching of said first bistable device to its output signal stable state; said second generating means including means coupled to both of said bistable devices for providing a signal in response to switching of one of said bistable devices to its second stable state.

23. The apparatus of claim 22 wherein said first and second bistable means includes first and second circuit means respectively coupled thereto for respectively providing said first and second signals in response to switching of the respective bistable device to its second stable state; said last-named signal being said output signal.

24. The apparatus of claim 23 wherein continued movement of said member in a given direction causes said first sensing means and one of said second and third sensing means successively to sense passage of an actuating element, thereby successively and sequentially switching both of said bistable devices to their first stable state and the respective one of said bistable devices to its second stable state, said output signal generating means including means for generating one output signal pulse in response to each switching of one of said bistable devices to its second stable state.

25. The apparatus of claim 22 further comprising a control element, first means for mounting said element for selective rotation about an axis in forward and reverse directions, means for moving said member in forward and reverse directions in response to rotation of said element in forward and reverse directions, respectively; second means for mounting said rotatable element for selective rotation in forward and reverse directions about a second axis normal to said first-named axis, said first-named and second mounting means being adapted to permit simultaneous rotation of said element about both of said axes; and a second control system duplicative of the first-named control system, the moving means of said second system moving the respective member in response to rotation of said element about said second axis; each of said first and second systems further including means for converting the respective output signals to analog signals having a magnitude and sign responsive to the amount and direction of rotation of said rotatable element about the respective axis; a display device having means for generating a cursor beam and means for deflecting said beam in X and Y coordinates, said converting means of said first and second systems being respectively coupled to said deflecting means whereby said beam is deflected in said coordinates responsive to the amount and direction of rotation of said element about the respective axis; each of said converting means respectively including means for additionally generally centering said beam on said display device with said rotatable element at an initial position, whereby rotation of said element about said axes away from its initial position results in deflection of said beam in the respective X and Y coordinates in either direction from its initial position responsive to the direction of rotation of said element; continued movement of a respective member in a given direction responsive to continued rotation of said rotatable element in one direction about a respective axis causing the respective first sensing means and one of the respective second and third sensing means successively to sense passage of an actuating element thereby successively and sequentially switching both of the respective bistable devices to their first stable state and the respective one of the first and second bistable devices to its output signal stable state; each of said second generating means further including means for generating one output signal pulse in response to said actuation of at least one of said sensing means; each of said converting means including means coupled to the respective output signal generating means for cumulatively counting said pulses up and down in response to the respective first and second signals, means for providing a digital readout of the cumulative count in said counting means, and a digital-to-analog converter coupled to said digital readout means for providing the respective analog signal.

26. The apparatus of claim 25 further comprising means for selectively switching all of said bistable devices of both of said systems to their first stable states and the counting means of both of said systems to a zero count thereby returning said beam to its initial centered position.

27. The apparatus of claim 22 including a third bistable device having first and second means for switching the same between first and second stable states, fourth means for coupling said second sensing means to said first switching means of said third bistable device for switching the same to its first stable state in response to sensing of the passage of an element by said second sensing means, fifth means for coupling said third sensing means to said second switching means of said third bistable device for switching the same to its second stable state in response to sensing of passage of an element by said third sensing means, and first and second circuit means coupled to said third bistable device for respectively providing said first and second signals in response to the stable state of said third bistable device.

28. The apparatus of claim 27 wherein said last-named signal is provided by switching of one of said first and second bistable devices to its second stable state in response to sensing of the passage of an actuating element by one of said second and third sensing means, said output signal generating means further including means for providing said output signal cumulatively in response to said last-named signal and switching of said third bistable device to the respective one of its stable states upon sensing of the passage of an actuating element by the other of said second and third sensing means and sensing of the passage of an actuating element by said first sensing means whereby said output signal generating means provides said output signal in response to sequential sensing of the passage of an actuating element by said first sensing means and one of said second and third sensing means followed by the other of said second and third sensing means, and thereafter said first sensing means.

29. The apparatus of claim 22 wherein said output signal generating means includes means for generating one output signal pulse in response to said actuation of at least one of said sensing means and bistable means, means coupled to said output signal generating means for cumulatively counting said pulses up and down in response to said first and second signals, respectively, and means for selectively switching both of said bistable devices to their first stable states and said counting means to an initial count.